US011448229B2

(12) United States Patent
Madoche

(10) Patent No.: US 11,448,229 B2
(45) Date of Patent: Sep. 20, 2022

(54) SEAL ASSEMBLY

(71) Applicant: Jody Madoche, St. Albert (CA)

(72) Inventor: Jody Madoche, St. Albert (CA)

( * ) Notice: Subject to any disclaimer, the term of this patent is extended or adjusted under 35 U.S.C. 154(b) by 801 days.

(21) Appl. No.: 16/370,441

(22) Filed: Mar. 29, 2019

(65) Prior Publication Data

US 2020/0309145 A1 Oct. 1, 2020

(51) Int. Cl.
*F04D 29/12* (2006.01)
*F16J 15/16* (2006.01)
*F16J 15/34* (2006.01)
*F04B 5/02* (2006.01)
*F04B 1/0448* (2020.01)
*F16J 15/26* (2006.01)
*F16J 15/00* (2006.01)

(52) U.S. Cl.
CPC ............ *F04D 29/12* (2013.01); *F04B 1/0448* (2013.01); *F04B 5/02* (2013.01); *F16J 15/164* (2013.01); *F16J 15/26* (2013.01); *F16J 15/344* (2013.01); *F16J 15/346* (2013.01); *F16J 15/3436* (2013.01); *F05D 2260/6022* (2013.01); *F16J 15/004* (2013.01)

(58) Field of Classification Search
CPC .............. F04D 29/12; F05D 2260/6022; F16J 15/3436; F16J 15/18; F16J 15/344; F16J 15/346; F16J 15/185; F16J 15/26; F16J 15/164; F16J 15/004; F04B 5/02; F04B 53/02; F04B 1/0448
See application file for complete search history.

(56) References Cited

U.S. PATENT DOCUMENTS

| | | | |
|---|---|---|---|
| 1,658,705 A | 2/1928 | Caproni | |
| 4,057,367 A | 11/1977 | Moe et al. | |
| 4,212,474 A | 7/1980 | Arai | |
| 4,257,795 A | 3/1981 | Shaw | |
| 4,907,812 A | 3/1990 | Meyer | |
| 4,915,596 A | 4/1990 | McCall | |
| 5,378,116 A * | 1/1995 | Bennitt | F04B 49/10 417/311 |

(Continued)

FOREIGN PATENT DOCUMENTS

| | | |
|---|---|---|
| CA | 2775778 A1 | 11/2013 |
| DE | 2637028 A1 | 2/1978 |

(Continued)

*Primary Examiner* — Shafiq Mian
(74) *Attorney, Agent, or Firm* — Nathan V. Woodruff

(57) ABSTRACT

A seal assembly for sealing an annular space between a first cylindrical surface and a second cylindrical surface. The annular space has high pressure zones and low pressure zones. The seal assembly has an annular seal with an inner surface that faces the second cylindrical component, an outer surface that faces the first cylindrical component, a sealing end and an engagement end. A seal actuator assembly applies a force to the engagement end of the annular seal to urge the annular seal in a first direction towards an engaged position within the annular space. The force applied to the engagement end of the annular seal has a first component aligned with the first direction and a second component that is perpendicular to the first direction. The first component is at least 1.7 times greater than the second component.

24 Claims, 5 Drawing Sheets

(56) References Cited

U.S. PATENT DOCUMENTS

| | | | | |
|---|---|---|---|---|
| 6,010,320 | A * | 1/2000 | Kwon | F04C 23/00 |
| | | | | 184/6.16 |
| 6,244,961 | B1 * | 6/2001 | Kleiner | F16D 27/10 |
| | | | | 464/30 |
| 6,858,067 | B2 | 2/2005 | Burns et al. | |
| 6,886,354 | B2 | 5/2005 | Dudley | |
| 8,181,966 | B2 | 5/2012 | Haynes et al. | |
| 2002/0128135 | A1 * | 9/2002 | Asp | B23Q 1/0036 |
| | | | | 483/902 |
| 2010/0230227 | A1 * | 9/2010 | Parsons | F16D 27/105 |
| | | | | 192/65 |
| 2011/0290812 | A1 * | 12/2011 | Garver | F16J 15/48 |
| | | | | 220/669 |
| 2012/0051958 | A1 | 3/2012 | Santos et al. | |
| 2015/0108721 | A1 | 4/2015 | Thuillier | |

FOREIGN PATENT DOCUMENTS

| | | |
|---|---|---|
| EP | 0032323 A1 | 7/1981 |
| EP | 2824346 B1 | 11/2017 |

* cited by examiner

SEAL ASSEMBLY

TECHNICAL FIELD

This relates to a seal assembly for a rotary compressor or motor, namely a seal assembly that accommodates high and low pressure.

BACKGROUND

In devices that require sealing from fluid at both a high pressure and a low pressure, such as pumps, compressors, combustion engines, or turbo-expanders, a seal that is designed to withstand high pressure can cause large amounts of friction when exposed to a low pressure. This is particularly important where sealing occurs along significant lengths. Various adjustable seals are available, such as U.S. Pat. No. 4,386,786 entitled "Adjustable pump seal with tapered conical members" which describes a pump seal that can be adjusted after wearing has occurred.

SUMMARY

According to an aspect, there is provided a seal assembly that seals an annular space between a first cylindrical surface and a second cylindrical surface that is coaxially nested within the first cylindrical surface about a central axis, the annular space having one or more high pressure zones and one or more low pressure zones spaced radially from the one or more high pressure zones, the seal assembly comprising an annular seal having an inner surface facing the second cylindrical component, an outer surface facing the first cylindrical component, a sealing end, and an engagement end and a seal actuator assembly that applies a force to the engagement end of the annular seal to urge the annular seal in a first direction toward an engaged position within the annular space, the force applied to the engagement end of the annular seal having a first component that is aligned with the first direction, and a second component that is perpendicular to the first direction, the first component being at least 1.7 times greater than the second component.

According to other aspects, the seal assembly may comprise one or more of the following features, alone or in combination: the seal actuator assembly may secure at least a portion of the annular seal against fluid pressure in the one or more high pressure zones in the annular space; the annular space may comprise a slotted ring that separates the one or more low pressure zones from the one or more high pressure zones; the seal actuator assembly may comprise a release surface spaced from the engagement end of the annular seal, the release surface disengaging the seal actuator assembly from the engagement end upon application of a releasing force applied to the release surface; the seal assembly may further comprise at least one release actuator, the seal actuator assembly rotates about the central axis and relative to the at least one release actuator, such that the seal actuator assembly is disengaged from the engagement end at least once per rotation of the seal actuator assembly; the seal actuator assembly may comprise a seal actuator that applies the force to the engagement end of the annular seal, the seal actuator having a surface that is angled at about 60 degrees or more from the first direction; the seal actuator may comprise one or more spring biased member comprising an angled surface that engages the engagement end of the annular seal, the angled surface being movable in a direction that is perpendicular to the first direction; the seal actuator may comprise one or more spring biased member comprising an angled surface that engages the engagement end of the annular seal, the angled surface being rotatable about an axis that is perpendicular to the first direction; the annular seal, the seal actuator assembly, and the second cylindrical surface may rotate about the central axis relative to the first cylindrical component; the annular seal may provide a seal between the one or more high pressure zones and the one or more low pressure zones; and the inner surface of the annular seal may engage the second cylindrical surface, the outer surface of the annular seal may engage the first cylindrical surface, or the inner surface of the annular seal may engage the second cylindrical surface and the outer surface of the annular seal may engage the first cylindrical surface.

According to an aspect, there is provided a fluid pump comprising a housing having a fluid inlet and a fluid outlet, a first cylindrical surface inside the housing, a rotary body that rotates about a central axis within the housing, the rotary body comprising a second cylindrical surface facing the first cylindrical surface such that the first cylindrical surface and the second cylindrical surface define an annular space, the annular space having one or more low pressure zone and one or more high pressure zone and one or more piston chambers open to the second cylindrical surface, each piston chamber housing a piston that reciprocates within the piston chamber, an annular seal having an inner surface that faces the second cylindrical surface, an outer surface that faces the first cylindrical surface, a sealing end and an engagement end, a seal actuator assembly that applies a force to the engagement end of the annular seal to urge the annular seal in a first direction toward an engaged position within the annular space, the force applied to the engagement end of the annular seal having a first component that is aligned with the first direction, and a second component that is perpendicular to the first direction, the first component being at least 1.7 times greater than the second component, and a driver for rotating the rotary body about the central axis.

According to other aspects, the fluid pump may comprise one or more of the following features, alone or in combination: the seal actuator assembly may secure at least a portion of the annular seal around the one or more high pressure zones in the annular space; the annular space may comprise a slotted ring that separates the one or more low pressure zones from the one or more high pressure zones; the seal actuator assembly may comprise a release surface spaced from the engagement end of the annular seal, the release surface disengaging the seal actuator assembly from the engagement end upon application of a releasing force applied to the release surface; the fluid pump may further comprise at least one release actuator, the seal actuator assembly rotates about the central axis and relative to the at least one release actuator, such that the seal actuator assembly is disengaged from the engagement end at least once per rotation of the seal actuator assembly component; the seal actuator assembly may comprise a seal actuator that applies the force to the engagement end of the annular seal, the seal actuator having a surface that is angled at about 60 degrees or more from the first direction; the seal actuator may comprise one or more spring biased members comprising an angled surface that engages the engagement end of the annular seal, the angled surface being movable in a direction that is perpendicular to the first direction; the seal actuator may comprise one or more spring biased member comprising an angled surface that engages the engagement end of the annular seal, the angled surface being rotatable about an axis that is perpendicular to the first direction; the annular seal and the seal actuator assembly may rotate with the rotary body about the central axis; the annular seal may provide a seal between the one or more high pressure zones and the one or more low pressure zones; and the inner surface of the annular seal may engage the second cylindrical surface, the outer surface of the annular seal may engage the first cylindrical surface, or the inner surface of the annular seal may engage the second cylindrical surface and the outer surface of the annular seal may engage the first cylindrical surface.

According to an aspect, there is provided a seal assembly that seals a cavity between a first surface and a second surface opposite the first surface, the seal assembly comprising a seal having a bottom surface facing the first surface, a top surface facing the bottom surface, a sealing end, and an engagement end and a seal actuator assembly that applies a force to the engagement end of the seal to urge the seal in a first direction toward an engaged position within the cavity, the force applied to the engagement end of the seal having a first component that is aligned with the first direction, and a second component that is perpendicular to the first direction, the first component being at least 1.7 times greater than the second component.

According to other aspects, the seal assembly may comprise one or more of the following features, alone or in combination: the seal actuator assembly may comprise a seal actuator that applies the force to the engagement end of the seal, the seal actuator having a surface that is angled at about 60 degrees or more from the first direction; the seal actuator may comprise one or more spring biased members comprising an angled surface that engages the engagement end of the seal, the angled surface being movable in a direction that is perpendicular to the first direction; and the seal actuator may comprise one or more spring biased member comprising an angled surface that engages the engagement end of the annular seal, the angled surface being rotatable about an axis that is perpendicular to the first direction.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
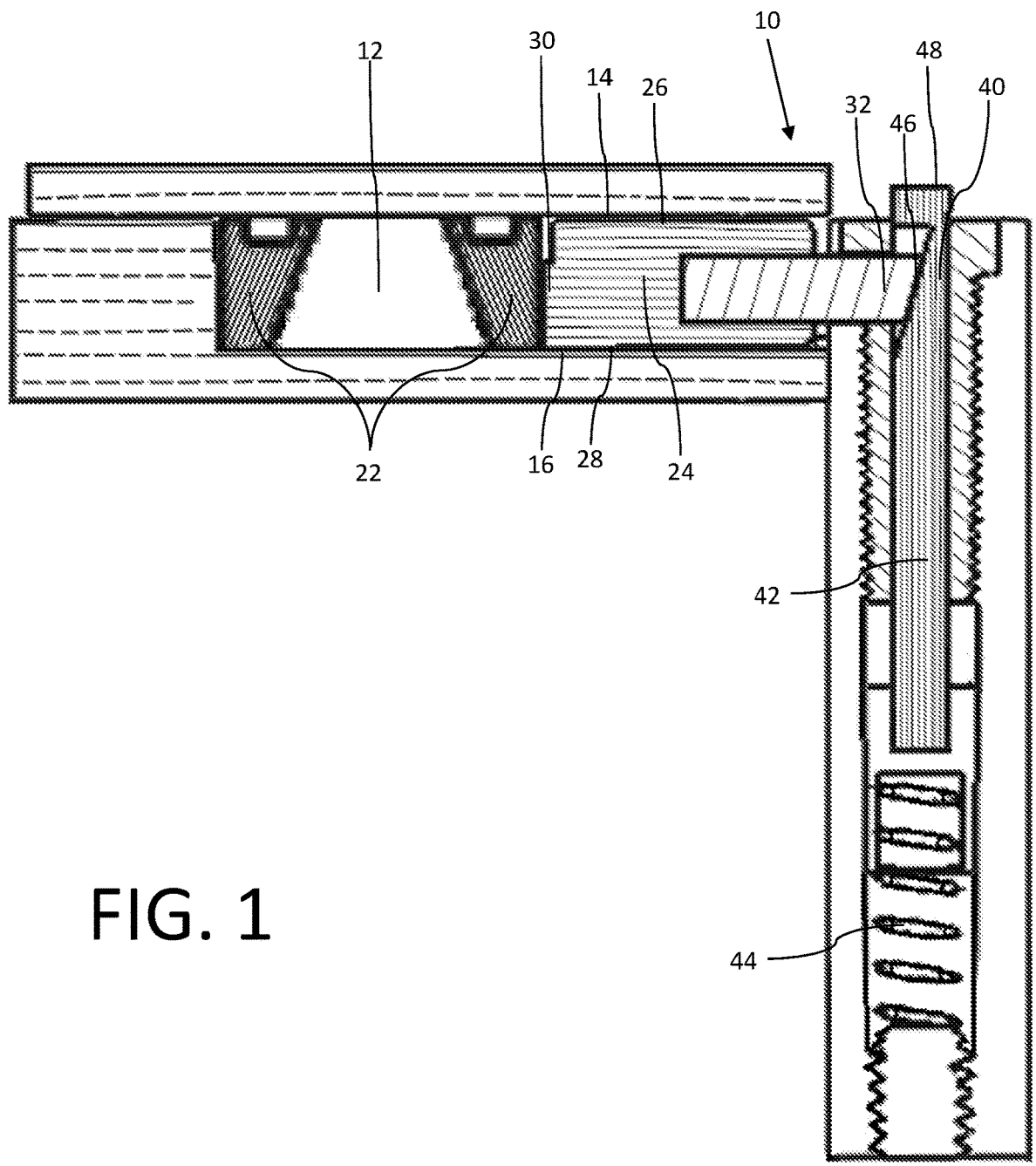
FIG. 1 is a detailed side elevation view in section of a seal assembly.

A seal assembly, generally identified by reference numeral 10, will now be described with reference to FIG. 1 through 5.

Referring to FIG. 1, seal assembly 10 seals within a cavity 12 between a first surface 14 and a second surface 16 opposite first surface 14. Seal assembly 12 has a seal 24 with a top surface 26 facing first surface 14, a bottom surface 28 facing second surface 16, a sealing end 30 and an engagement end 32. Typically, sealing end 30 of seal 24 will engage another surface, such as a component 22 in cavity 12. Seal 24 may be made from various materials that will depend on the purpose of seal 24, and the environment that it will be used in. For example, seal 24 may be a soft or hard rubber that is pressed into engagement with component 22. Seal 24 may also be machined metal, where seal 24 is machined to precise tolerances to create a metal to metal seal and preferably does not undergo any plastic or elastic deformation. Other alternatives with differing levels of hardness and elasticity will be recognised by those skilled in the art. As shown, seal 24 is a composite seal, with a machined annular ring as the body, and pins that extend out the back of the machined annular ring. Seal 24 may be made in any suitable format as recognized by those skilled in the art.

Engagement end 32 of seal 24 is engaged by a seal actuator assembly 40. Seal actuator assembly 40 applies a force to engagement end 32 that urges seal 24 in a first direction towards cavity 12. The force applied to engagement end 32 has first component that is parallel to the first direction and a second component that is perpendicular to the first direction. Seal actuator assembly 40 and seal 24 are designed such that the first component of the force is greater than the second component, such that actuator assembly 40 applies a force that is able to press seal 24 toward cavity 12, while resisting an opposite force applied by seal 24 against actuator assembly 40. In one example, the first component may be at least 1.7 times greater in magnitude than the second component of the force. Seal 24 is constrained to move between first and second surfaces 14 and 16, which will generally be parallel to the first direction, particularly when sealing an annular space. Seal actuator assembly 40 secures seal 24 from moving in a direction opposite to the first direction. For example, seal actuator assembly 40 may secure seal 24 against fluid pressure in one or more high pressure zones 18 within cavity 12 and ensure that seal 24 remains in a desired position as set by actuator assembly 40 when passing through high pressure zones 18 and low pressure zones 20 within cavity 12. In the depicted example, seal actuator assembly 40 uses a seal actuator 42 that is biased into engagement with engagement end 32 to apply the force to engagement end 32. Seal actuator 42 may be biased by a biasing element 44 into engagement with engagement end 32. As depicted in FIG. 1, biasing element 44 is a spring, however it will be understood that biasing element 44 may take other forms, such as a hydraulic actuator, pneumatic actuator, air spring, other elastic material, or another component capable of providing a biasing force. Alternatively while, FIG. 1 depicts actuator 42 as moving linearly, actuator 42 may be biased to rotate, in which case it would be rotationally biased, such as with a torsion spring, etc. Seal actuator 42 is shown as having an angled surface 46 that, as seal actuator 42 moves in a direction substantially perpendicular to the direction of travel of seal 24, transfers the force to engagement end 32 to urge seal 24 into the engaged position while also securing seal 24 in the engaged position against moving in a direction opposite to the first direction. Preferably, seal 24 may also include a corresponding angled surface 46 to ensure an efficient transfer of energy from actuator 42 to seal 24.

In a preferred embodiment, angled surface 46 is preferably angled at about 60 degrees or more from the first direction, however the actual angle will depend on the preferences of the user, and the forces that will be encountered. Actuator 42 is shown as moving linearly and substantially perpendicular to the direction in which seal 24 is urged. However, actuator 42 may rotate rather than move linearly, in which case angled surface 46 may be a cammed surface that extends around actuator 42. In addition, actuator 42 may not necessarily be perpendicular to seal 24, although for most cases, it is expected that this will provide a more efficient design.

As noted above, actuator assembly 40 is used to secure seal 24 against movement away from cavity 12 by applying a biasing force. Seal 24 may be secured by seal actuator 42 via the force applied by biasing element 44, friction between moving and stationary elements, or a combination of the two. As actuator 42 is biased outward in the depicted example, angled surface 46 moves to selectively engage with engagement end 32 of seal 24. For example, in the depicted example, angled surface is movable along an axis that is perpendicular to the first direction, but may also rotate along an axis that is perpendicular to the first direction, as discussed above.

Figure 2:
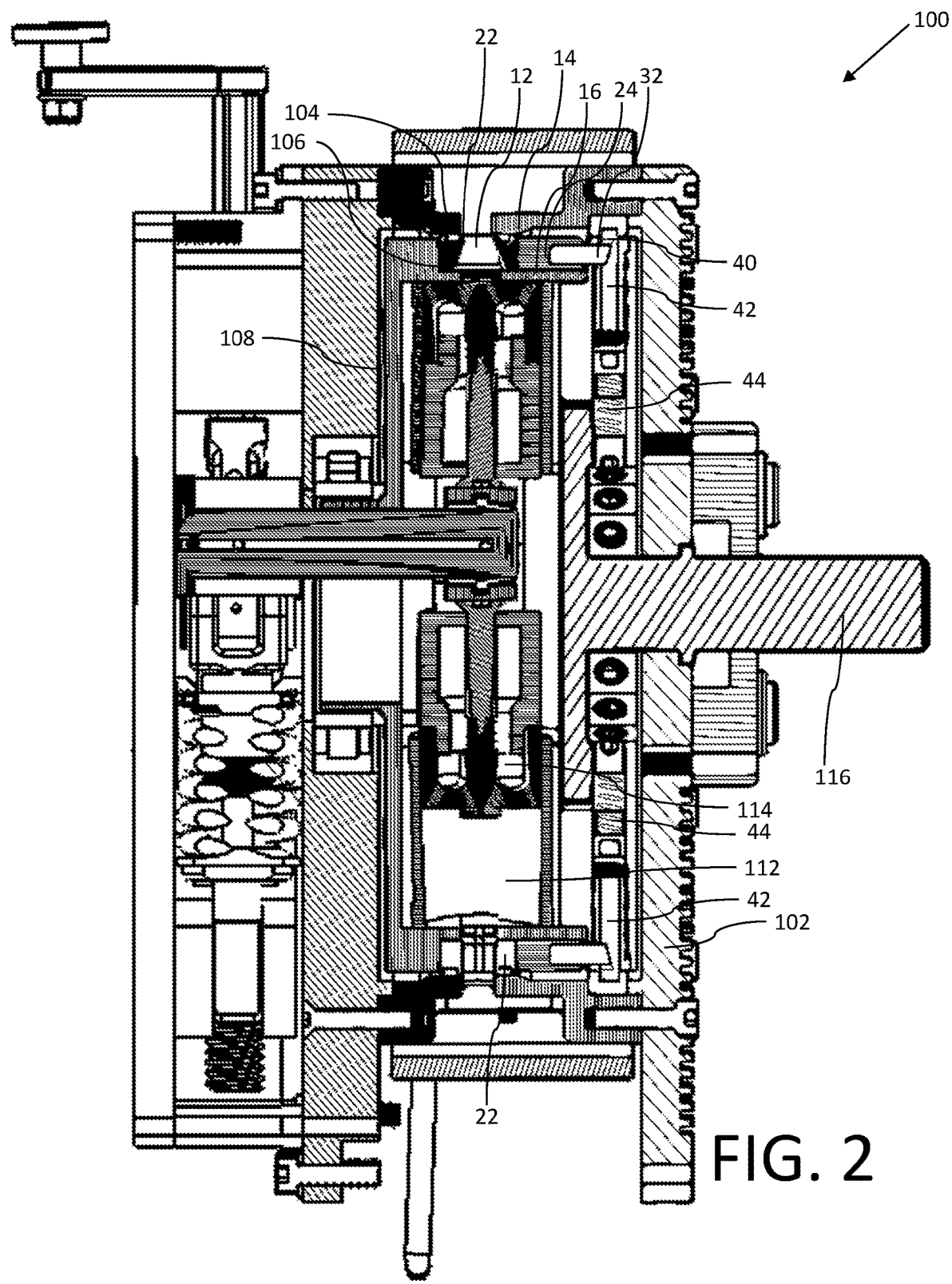
FIG. 2 is a side elevation view in section of a rotary compressor that includes a seal assembly.

Referring to FIG. 2, seal assembly 10 may be used to seal within a rotary fluid pump or compressor, generally identified by reference numeral 100. As depicted, seal assembly 10 is used to seal within an annular space formed by nesting two cylindrical surfaces, although it will be understood that seal assembly 10 is also capable of sealing a cavity created by opposing surfaces in other devices and for other purposes.

As noted above, seal assembly 10 is designed to be able to withstand the application of high and low pressure without moving out of sealing engagement. These high and low pressure areas may arise in, for example, rotary pumps and compressors, where liquid or gas is drawn in at one point along the circumference of the device, and expelled at another. This may be used to compress a gas, pump fluid, act as a vacuum, or other uses, and will be referred to herein as a fluid pump.

Figure 3:
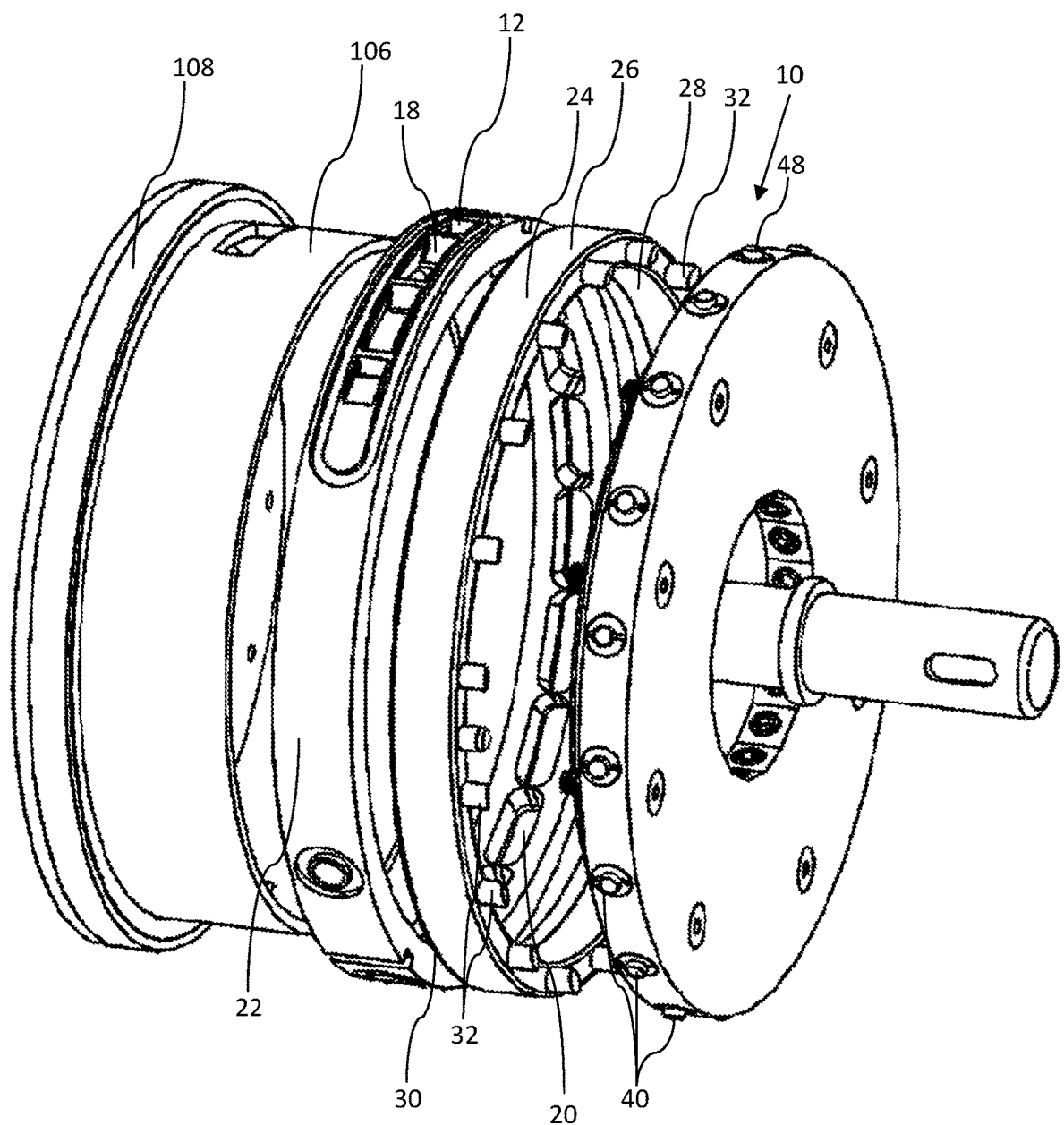
FIG. 3 is an exploded perspective view of a seal assembly and rotary body for a rotary compressor.
Figure 4:
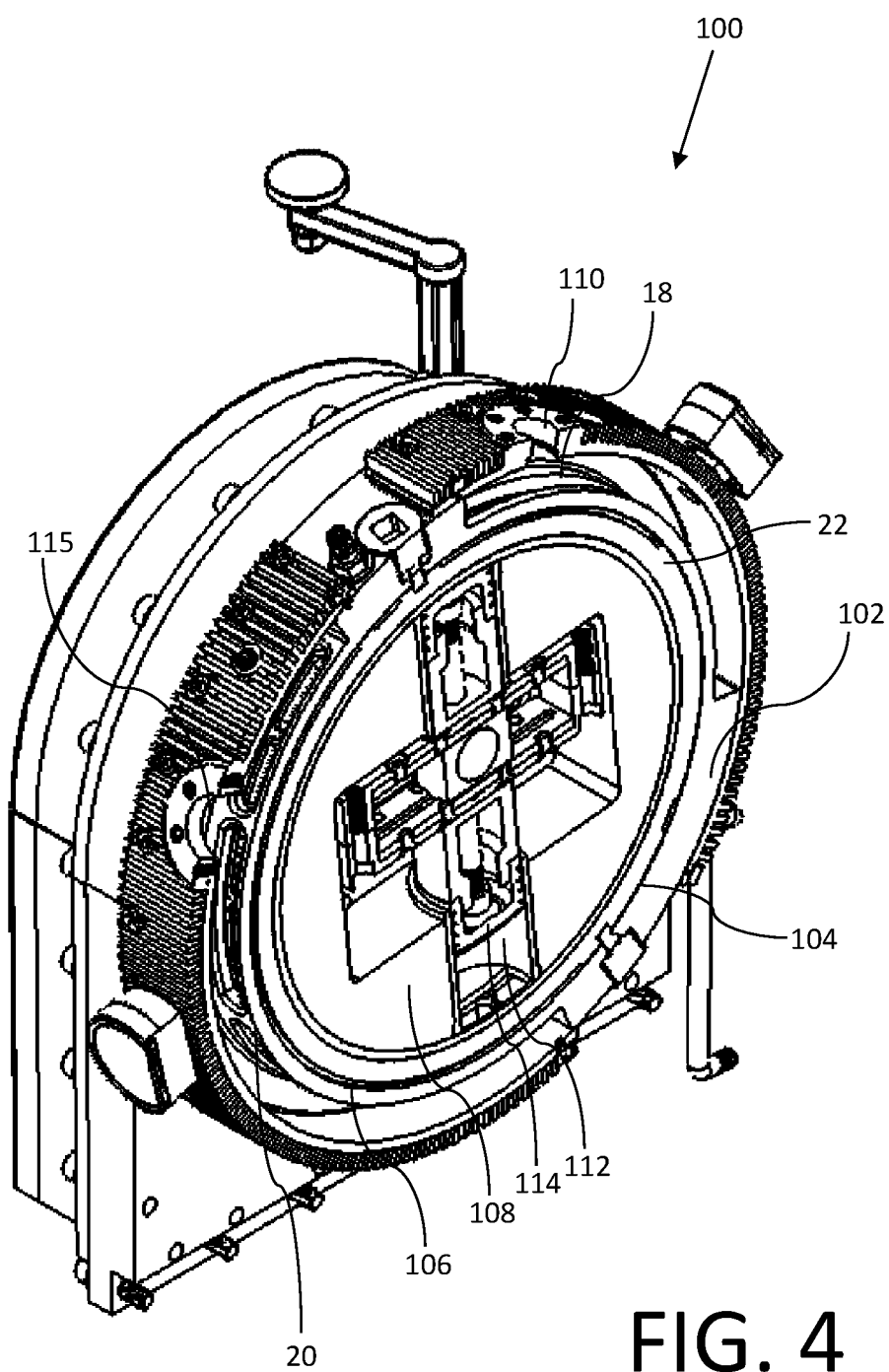
FIG. 4 is a perspective view of an axial cross section of a rotary pump.

Referring to FIG. 2 to FIG. 4, there will now be given an example of seal assembly 10 used to seal a rotary pump. An annular space 12 is formed between a first cylindrical surface 104 and a second cylindrical surface 106 nested within first cylindrical surface 104. In the case of a rotary pump, second cylindrical surface 106 rotates relative to first cylindrical surface 104. Annular space 12, first cylindrical surface 104 and second cylindrical surface share a central axis. First cylindrical surface 104 is on the inside of a housing 102 of rotary pump 100 and second cylindrical surface 106 is an outer surface of a rotary body 108 nested within housing 102. Seal 24 is positioned between first and second cylindrical surfaces 104 and 106. As rotary body 108 rotates, it passes through high pressure zone 18 connected to a fluid outlet 110, and low pressure zone 20 connected to a fluid inlet 115. A slotted ring 22 is used to separate high pressure zone 18 from low pressure zone 20, where slotted ring 22 has openings that correspond with outlet 110 and inlet 115, and otherwise helps sealingly separate these zones. It will be understood that there may be more than one high pressure zone 18, more than one low pressure zone 20, and that high pressure zones 18 and low pressure zones 20 may be separated by other designs, such as protrusions from first cylindrical surface 104 or second cylindrical surface 106, etc.

In the depicted example, rotary body 108 is rotated by a driver 116 about a central axis within housing 102. Rotary body 108 has a piston chamber 112 that is open at either end to the second cylindrical surface 106. A piston 114 reciprocates within piston chamber 112 to create high pressure zone 18 at one end of piston chamber 112 while simultaneously creating low pressure zone 20 at the other end of piston chamber 112. As shown, fluid is drawn into piston chamber 112 as piston 114 withdraws from one side of rotary body 108 toward the other side of rotary body 108, where the fluid is pressurized to compress a gas, or expel a liquid at a desired pressure, as may be the case. Depending on its size and configuration, rotary body 108 may have more than one piston chamber 112 and piston 114.

Annular seal 24 is coaxially disposed between first cylindrical surface 104 and second cylindrical surface 106. Annular seal 24 is similar to seal 24 described above and has an outer surface 26, an inner surface 28, a sealing end 30 and an engagement end 32. Outer surface 26 faces first cylindrical surface 104 and inner surface 28 faces second cylindrical surface 106. Outer surface 26 may engage first cylindrical surface 104 and inner surface 28 may engage second cylindrical surface 16, depending on the sealing requirements. Sealing end 30 is adjacent to annular space 12 and engages slotted ring 22, either directly as shown, or by an intermediate seal (not shown). Annular seal 24 is used with slotted ring 22 to maintain a seal between high pressure zone 18 and low pressure zone 20 within annular space 12.

Referring to FIG. 2, annular seal 24 is urged toward slotted ring 22 by seal actuator assembly 40 as described above. Preferably and as shown, there are a plurality of seal actuator assemblies 40 spaced circumferentially about second cylindrical surface 106 to engage annular seal 24 at a plurality of locations. The spacing and number of actuator assemblies 40 will depend on the size of rotary pump 100, the pressures encountered, as well as the material properties of actuator assembly 40, seal 24, etc.

In some circumstances, the design of seal actuator assembly 40 may result in seal 24 becoming held too tightly within cavity 12, which may cause problems, such as an unnecessary increase in wear or friction as rotary pump operates. To avoid this scenario, actuator assembly 40 may be designed to be periodically disengaged or released from engagement end 32 of annular seal 24, or in other words, to reduce the force applied by actuator 42 and allow seal 24 to return to a neutral position.

Figure 5:
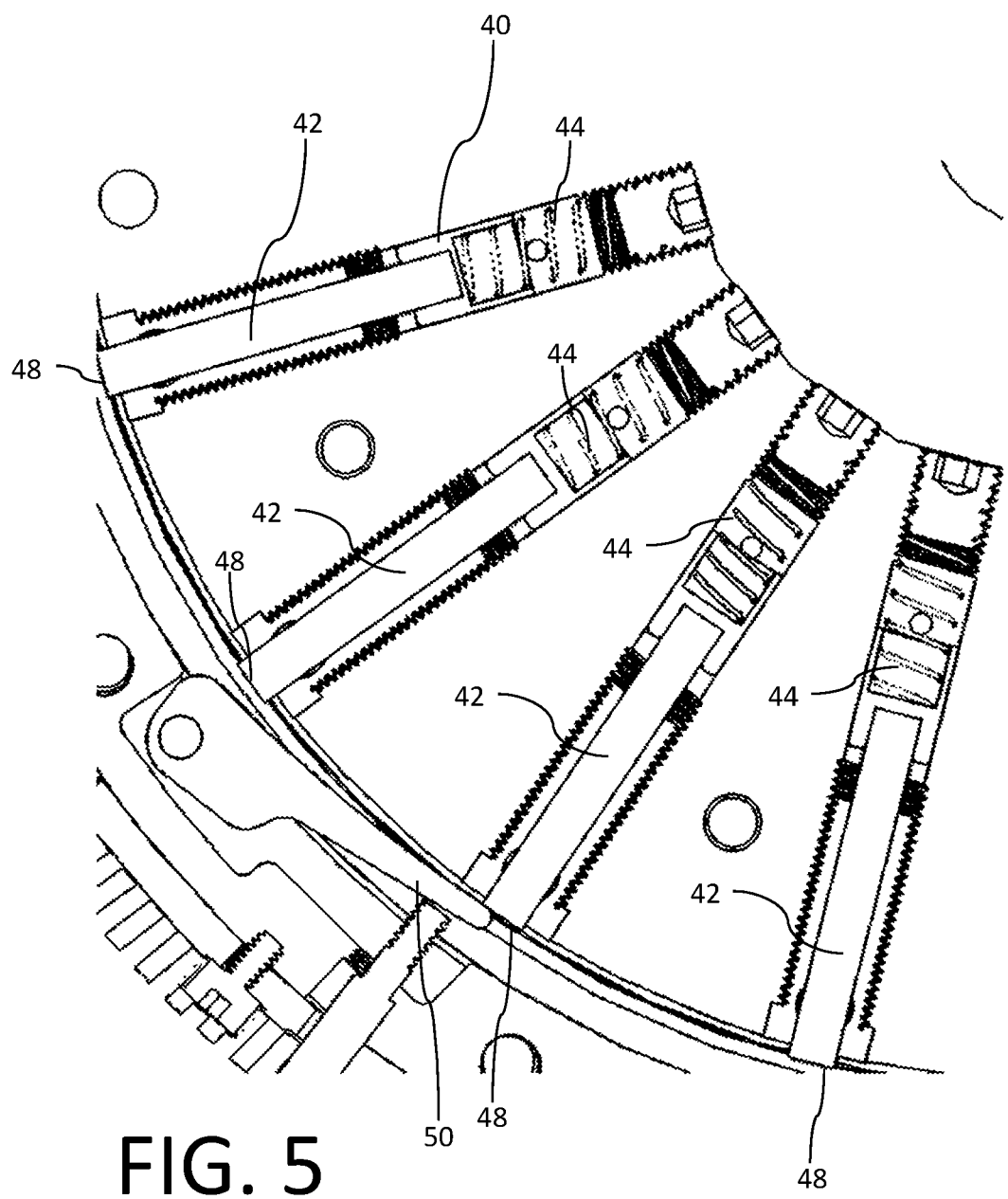
FIG. 5 is a detailed end elevation view in section of a seal actuator assembly.

As shown in FIG. 5, seal actuator assembly 40 is disengaged by a release actuator 50, such as a ramp as shown that applies a releasing force to a release surface 48 of seal actuator 42, which, as shown, is an extension of actuator 42 that protrudes from rotary body 108. It will be understood that other designs may be used to disengage seal actuator assembly 40 from seal 24. For example, ramp 48 may positioned be on the inside or outside of seal 24 relative to the axis of rotation, or it may be at an intermediate position, or may be a structure that rotates actuator 40 if actuator 40 has a cam surface. After seal actuator assembly 40 has been disengaged from seal 24, biasing element 44 returns seal actuator 42 into engagement with engagement end 32 of annular seal 24. Seal actuator assembly 40 may be selectively disengaged by release actuator 48 as second cylindrical component 106 rotates relative to first cylindrical component 104. Seal actuator assembly 40 may be disengaged one or more times per rotation, or seal actuator assembly 40 may be engaged or disengaged when a predetermined condition has been met, such as a specific number of rotations or a pressure within housing 102. As seal 24 is more likely to become tightly engaged after passing through a low pressure area, it may be preferable to position release actuator 48 after seal 24 passes through the low pressure zone. Fluid pressure from high pressure zones 18 may act on seal 24 to reduce friction when seal 24 is tightly engaged. In one example, annular seal 24 and seal actuator assembly 40 may rotate with second cylindrical component 106 relative to first cylindrical component 104, which carries a static release surface 48. In another example, release surface 48 may rotate with second cylindrical component 106 relative to first cylindrical component 104, and annular seal 24 may be stationary with seal actuator assembly 40. It may also be possible to have relative rotation between annular seal 24 and actuator assembly 40, however this is not preferred.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A seal assembly that seals an annular space between a first cylindrical surface and a second cylindrical surface, the second cylindrical surface being coaxially nested within the first cylindrical surface about a central axis, the annular space having one or more high pressure zones and one or more low pressure zones spaced radially from the one or more high pressure zones, the seal assembly comprising:
   an annular seal having an inner surface facing the second cylindrical surface, an outer surface facing the first cylindrical surface, a sealing end, and an engagement end; and
   a seal actuator assembly that applies a force to the engagement end of the annular seal to urge the annular seal in a first direction toward an engaged position within the annular space, the force applied to the engagement end of the annular seal having a first component that is aligned with the first direction, and a second component that is perpendicular to the first direction, the first component being at least 1.7 times greater than the second component.

2. The seal assembly of claim 1, wherein the seal actuator assembly secures at least a portion of the annular seal against fluid pressure in the one or more high pressure zones in the annular space.

3. The seal assembly of claim 1, wherein the annular space comprises a slotted ring that separates the one or more low pressure zones from the one or more high pressure zones.

4. The seal assembly of claim 1, wherein the seal actuator assembly comprises a release surface spaced from the engagement end of the annular seal, the release surface disengaging the seal actuator assembly from the engagement end upon application of a releasing force applied to the release surface.

5. The seal assembly of claim 4, further comprising at least one release actuator, the seal actuator assembly rotates about the central axis and relative to the at least one release actuator, such that the seal actuator assembly is disengaged from the engagement end at least once per rotation of the seal actuator assembly.

6. The seal assembly of claim 1, wherein the seal actuator assembly comprises a seal actuator that applies the force to the engagement end of the annular seal, the seal actuator having a surface that is angled at about 60 degrees or more from the first direction.

7. The seal assembly of claim 1, wherein the seal actuator comprises one or more spring biased member comprising an angled surface that engages the engagement end of the annular seal, the angled surface being movable in a direction that is perpendicular to the first direction.

8. The seal assembly of claim 1, wherein the seal actuator comprises one or more spring biased member comprising an angled surface that engages the engagement end of the annular seal, the angled surface being rotatable about an axis that is perpendicular to the first direction.

9. The seal assembly of claim 1, wherein the annular seal, the seal actuator assembly, and the second cylindrical surface rotate about the central axis relative to the first cylindrical surface.

10. The seal assembly of claim 1, wherein the annular seal provides a seal between the one or more high pressure zones and the one or more low pressure zones.

11. The seal assembly of claim 1, wherein the inner surface of the annular seal engages the second cylindrical surface, the outer surface of the annular seal engages the first cylindrical surface, or the inner surface of the annular seal engages the second cylindrical surface and the outer surface of the annular seal engages the first cylindrical surface.

12. A fluid pump comprising:
   a housing having a fluid inlet and a fluid outlet;
   a first cylindrical surface inside the housing;
   a rotary body that rotates about a central axis within the housing, the rotary body comprising:
      a second cylindrical surface facing the first cylindrical surface such that the first cylindrical surface and the second cylindrical surface define an annular space, the annular space having one or more low pressure zone and one or more high pressure zone; and
      one or more piston chambers open to the second cylindrical surface, each piston chamber housing a piston that reciprocates within the piston chamber;
   an annular seal having an inner surface that faces the second cylindrical surface, an outer surface that faces the first cylindrical surface, a sealing end and an engagement end;
   a seal actuator assembly that applies a force to the engagement end of the annular seal to urge the annular seal in a first direction toward an engaged position within the annular space, the force applied to the engagement end of the annular seal having a first component that is aligned with the first direction, and a second component that is perpendicular to the first direction, the first component being at least 1.7 times greater than the second component; and
   a driver for rotating the rotary body about the central axis.

13. The fluid pump of claim 12, wherein the seal actuator assembly secures at least a portion of the annular seal around the one or more high pressure zones in the annular space.

14. The fluid pump of claim 12, wherein the annular space comprises a slotted ring that separates the one or more low pressure zones from the one or more high pressure zones.

15. The fluid pump of claim 12, wherein the seal actuator assembly comprises a release surface spaced from the engagement end of the annular seal, the release surface disengaging the seal actuator assembly from the engagement end upon application of a releasing force applied to the release surface.

16. The fluid pump of claim 15, further comprising at least one release actuator, the seal actuator assembly rotates about the central axis and relative to the at least one release actuator, such that the seal actuator assembly is disengaged from the engagement end at least once per rotation of the seal actuator assembly.

17. The fluid pump of claim 12, wherein the seal actuator assembly comprises a seal actuator that applies the force to the engagement end of the annular seal, the seal actuator having a surface that is angled at about 60 degrees or more from the first direction.

18. The fluid pump of claim 12, wherein the seal actuator comprises one or more spring biased members comprising an angled surface that engages the engagement end of the annular seal, the angled surface being movable in a direction that is perpendicular to the first direction.

19. The fluid pump of claim 12, wherein the seal actuator comprises one or more spring biased member comprising an angled surface that engages the engagement end of the annular seal, the angled surface being rotatable about an axis that is perpendicular to the first direction.

20. The fluid pump of claim 12, wherein the annular seal and the seal actuator assembly rotate with the rotary body about the central axis.

21. The fluid pump of claim 12, wherein the annular seal provides a seal between the one or more high pressure zones and the one or more low pressure zones.

22. The fluid pump of claim 12, wherein inner surface of the annular seal engages the second cylindrical surface, the outer surface of the annular seal engages the first cylindrical surface, or the inner surface of the annular seal engages the second cylindrical surface and the outer surface of the annular seal engages the first cylindrical surface.

23. A seal assembly that seals a cavity between a first surface and a second surface opposite the first surface, the seal assembly comprising:
   a seal having a first face facing the first surface, a second face facing the second surface, a sealing end, and an engagement end; and
   a seal actuator assembly that applies a force to the engagement end of the seal to urge the seal in a first direction toward an engaged position within the cavity, the force applied to the engagement end of the seal having a first component that is aligned with the first direction, and a second component that is perpendicular to the first direction, the first component being at least 1.7 times greater than the second component, wherein the seal actuator comprises one or more spring biased members comprising an angled surface that engages the engagement end of the seal, the angled surface being movable in a direction that is perpendicular to the first direction or rotatable about an axis that is perpendicular to the first direction.

24. The seal assembly of claim 23, wherein the seal actuator assembly comprises a seal actuator that applies the force to the engagement end of the seal, the seal actuator having a surface that is angled at 60 degrees or more from the first direction.

* * * * *